(12) United States Patent
Roth et al.

(10) Patent No.: US 7,646,368 B2
(45) Date of Patent: Jan. 12, 2010

(54) SPOKE RECOVERY IN A COLOR DISPLAY

(75) Inventors: Shmuel Roth, Petach Tikva (IL); Moshe Ben-Chorin, Rehovot (IL)

(73) Assignee: Genoa Color Technologies Ltd., Hod Hasharon (IL)

( * ) Notice: Subject to any disclaimer, the term of this patent is extended or adjusted under 35 U.S.C. 154(b) by 618 days.

(21) Appl. No.: 10/568,885

(22) PCT Filed: Aug. 23, 2004

(86) PCT No.: PCT/IL2004/000769

§ 371 (c)(1),
(2), (4) Date: Feb. 21, 2006

(87) PCT Pub. No.: WO2005/019909

PCT Pub. Date: Mar. 3, 2005

(65) Prior Publication Data

US 2006/0221026 A1 Oct. 5, 2006

Related U.S. Application Data

(60) Provisional application No. 60/497,561, filed on Aug. 26, 2003.

(51) Int. Cl.
*G09G 3/34* (2006.01)
*G09G 5/10* (2006.01)
*H04N 9/12* (2006.01)
*G03B 21/14* (2006.01)

(52) U.S. Cl. .................. 345/84; 345/691; 348/743; 353/84

(58) Field of Classification Search ............ 345/84–85, 345/213, 63; 348/743–744; 353/31, 84–86
See application file for complete search history.

(56) References Cited

U.S. PATENT DOCUMENTS

| 5,592,188 | A | 1/1997 | Doherty et al. |
| 6,324,006 | B1 * | 11/2001 | Morgan ..................... 359/618 |
| 6,567,134 | B1 | 5/2003 | Morgan et al. |
| 7,061,512 | B2 * | 6/2006 | Morgan et al. ............. 345/691 |
| 2002/0003704 | A1 | 1/2002 | Ohmae et al. |

FOREIGN PATENT DOCUMENTS

WO WO 01/95544 * 12/2001

OTHER PUBLICATIONS

International Search Report for PCT/IL04/00769 mailed Feb. 2. 2006.

* cited by examiner

*Primary Examiner*—Bipin Shalwala
*Assistant Examiner*—Keith Crawley
(74) *Attorney, Agent, or Firm*—Pearl Cohen Zedek Latzer, LLP

(57) ABSTRACT

Embodiments of the invention include a method, device and/or system for spoke recovery. A method for spoke recovery in a sequential multi-primary color display may include producing a primary color image component corresponding to a first primary color during a display period including at least a portion of a spoke period of the first primary color and a second primary color.

34 Claims, 5 Drawing Sheets

SPOKE RECOVERY IN A COLOR DISPLAY

CROSS REFERENCE TO RELATED APPLICATIONS

This Application is a Filing Phase Application of International Application No. PCT/IL2004/00769, International Filing Date Aug. 23,2004, which claims priority of U.S. Provisional Patent Application, 60/497,561, Aug. 26, 2003.

FIELD OF THE INVENTION

The invention relates generally to color displays and, more particularly, to spoke recovery in color displays.

BACKGROUND

Various types of color display technologies are known in the art, for example, projection display systems. In front projection displays, the projected images are viewed from a reflective viewing screen. In rear projection displays, the projected images are viewed through a transmissive viewing screen.

To produce color images, existing display devices use three primary colors, typically red, green and blue, collectively referred to as RGB. In sequential projection display systems, a plurality of color filter segments on a color wheel are sequentially introduced to the path of light of a polychromatic beam to sequentially produce three primary color light beams. The primary color light beams are modulated sequentially, for example, using a single Spatial Light Modulator (SLM) panel, and displayed on the reflective or transmissive viewing screen.

Such sequential RGB devices may have at least three transition regions ("spokes"), each formed between two adjacent color filter segments such that part of the polychromatic light beam passes through one color filter segment, and part of the light beam passes through an adjacent color filter segment. In such devices, the light passing through a spoke may produce a mixed color, e.g., a combination of the two primary colors produced by the adjacent filter segments. For example, a mixed red-green color may be produced in the spoke between the red and green filter segments. Displaying the mixed color may distort the color of the viewed image.

In order to avoid this effect, some systems prevent displaying the mixed colors, e.g., by switching the SLM to an "off" mode of operation during each transition between two adjacent color segments, and/or by adding a generally black or non-transparent segment between two successive filter segments. However, in many implementations, the "spot size" of the polychromatic light beam, i.e., the cross-sectional area of the light beam focused on the filter segments, may be relatively large, for example, the spot size may span about 15 degrees out of the 360 degrees span of the color wheel, whereby the spoke time between two adjacent filter segments may be significant compared to the display time of the primary color segments. Thus, switching the SLM to the "off" mode may substantially reduce the luminance of the display.

An important consideration in designing projection display devices is the display brightness. Thus, efforts are continually made to increase the optical efficiency of existing designs and, thereby, to increase the luminous output that can be obtained from a given light source.

In the display device described in U.S. Pat. No. 5,592,188 to Doherty et al., the SLM is not switched to the "off" mode during the spokes. Instead, the SLM is provided with "white image" data at the spokes, whereby a viewed white image is produced by a combination of the color components produced by all three spokes on the color wheel. This white image may be utilized to enhance white areas of the color image. Although a correct color balance may be maintained by this solution, the additional white light may reduce the color saturation of the displayed image.

U.S. Pat. No. 6,567,134 to Morgan et al. describes a spoke light recovery method. The method includes calculating from primary color data representing the color image special "secondary color" images, namely, yellow, cyan and magenta color components corresponding to three mixtures of primary color pairs. The method also includes providing the secondary color image to the SLM during the spoke time between the corresponding primary color segments.

The use of spoke light recovery in the devices described above requires manipulating the image input data in order to provide special signals, e.g. corresponding to the white/secondary color components.

In a more-than-three-primary sequential projection device, e.g., as described in International Application PCT/IL01/00527, entitled "Device, System and Method For Electronic True Color Display", filed Jun. 7, 2001, and published Dec. 13, 2001 as WO 01/95544, assigned to the assignee of the present application, transition time becomes an important factor affecting display luminance, since the number of color filter segments is increased compared to RGB projection displays. Furthermore, the spokes of such multi-primary displays do not necessarily form a complementary set of colors.

SUMMARY OF EMBODIMENTS OF THE INVENTION

Some exemplary embodiments of the present invention provide a color display device implementing spoke recovery, e.g., to enhance luminance values of the primary colors.

The display device according to some exemplary embodiments of the invention may implement spoke recovery without calculating any additional image components, e.g., white image components and/or secondary color image components.

Some exemplary embodiments of the invention may be implemented in conjunction with a more-than-three primary color display device, for example, a five-primary-color display device. The display device may include a light source, a color switching mechanism, e.g., a color wheel, having a plurality of color filters corresponding to a plurality of primary colors, and a Spatial Light Modulator (SLM).

According to some exemplary embodiments of the invention, specific arrangements of the color filters and/or specific timing relations between an input signal provided to the SLM and a color light beam produced by the color filters may allow enhancement of the luminance of the primary colors. According to some exemplary embodiments of the invention, the display device may include a controller to control the spatial light modulator to produce a primary color image component corresponding to a first primary color during a display period including at least a portion of a spoke period of the first primary color and a second primary color. The display period may further include at least part of a spoke period of the first primary color and a third primary color. The display period may have a desired distribution between the spoke period of the first and second primary colors and the spoke period of the first and third primary colors.

According to some exemplary embodiments of the invention, the display period may be distributed generally symmetrically between the spoke period of the first and second primary colors and the spoke period of the first and third primary colors.

According to some exemplary embodiments of the invention, the display period may be represented by a plurality of bit planes including one or more highest significance bit planes, wherein one or more of the highest significance bit planes correspond to at least one of the spoke period of the first and second primary colors and the spoke period of the first and third primary colors.

According to some exemplary embodiments, a most significant bit plane of the one or more highest significance bit planes may correspond to both the spoke period of the first and second primary colors and the spoke period of the first and third primary colors.

According to some exemplary embodiments, a most significant bit plane of the one or more highest significance bit planes may correspond to a first end of an electronic color interval including the spoke period of the first and second primary colors, and a second-most significant bit plane of the one or more highest significance bit planes may correspond to a second end of the electronic color interval including the spoke period of said first and third primary colors.

According to some exemplary embodiments, the controller is able to control the spatial light modulator to produce a corrected succeeding primary color image component corresponding to the third primary color based on a value of a most significant bit plane and a second-most significant bit plane of the one or more highest significance bit planes.

According to some exemplary embodiments, the display period may be represented by a plurality of bit planes including at least one spoke bit plane corresponding to at least one of the spoke period of the first and second primary colors and the spoke period of the first and third primary colors, wherein the at least one spoke bit plane represents a time period shorter than a predetermined time period threshold.

According to some exemplary embodiments, the controller is able to control the spatial light modulator such that a viewed combination of colored light of the spoke period of the first and second primary colors and colored light of the spoke period of the first and third primary colors is generally equivalent to the first primary color.

According to some exemplary embodiments, the first, second and third primary colors are yellow, green and red, respectively.

According to some exemplary embodiments, the first, second and third primary colors are cyan, green and blue, respectively.

According to some exemplary embodiments, the first, second and third primary colors are magenta, blue and red, respectively.

According to some exemplary embodiments, the color switching mechanism may sequentially provide the spatial light modulator with colored light of a plurality of primary colors. According to some exemplary embodiments, at least three of the filters are arranged sequentially according to their hue values.

BRIEF DESCRIPTION OF THE DRAWINGS

The invention will be understood and appreciated more fully from the following detailed description of embodiments of the invention, taken in conjunction with the accompanying drawings of which.

Figure 1:
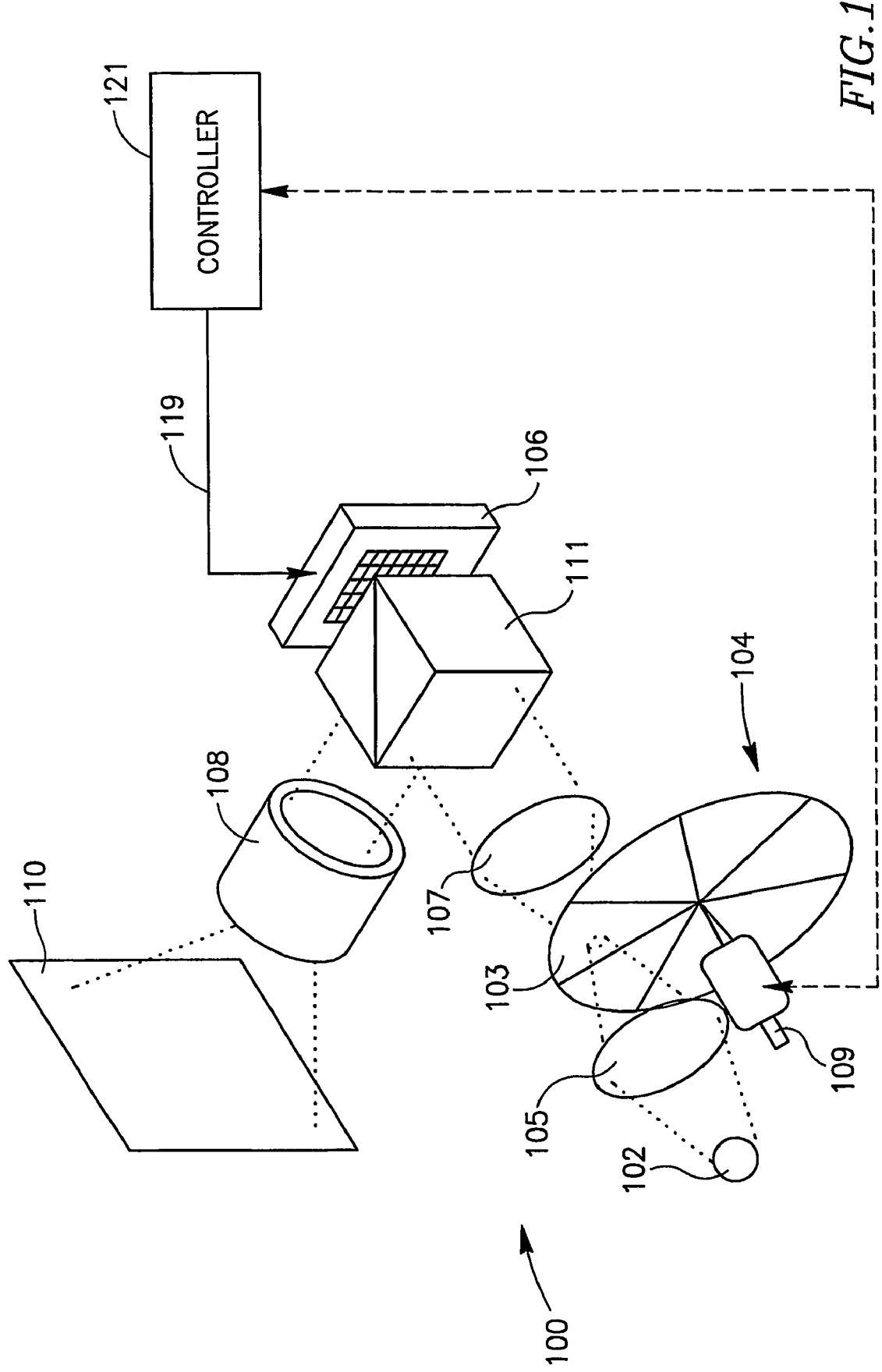
FIG. 1 is a schematic, simplified isometric-view illustration of a multi-primary display device, in accordance with exemplary embodiments of the invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Embodiments of monitors and display devices with more than three primaries, in accordance with exemplary embodiments of the invention, are described in International Application PCT/IL01/00527, filed Jun. 7, 2001, entitled "Device, System and Method For Electronic True Color Display" and published Dec. 13, 2001 as PCT Publication WO 01/95544, the disclosure of which is incorporated herein by reference.

Although some of the exemplary devices and/or methods described below are described in the context of devices for reproducing five primary colors, it may be appreciated by those skilled in the art, that similar devices and/or methods may be implemented, with appropriate changes, in conjunction with devices for reproducing more or less than five primary colors. For example, a four-primary color display may include blue, green, yellow and red primary color filters, and may implement some of the methods described below for spoke recovery of one or both of green-yellow and yellow-red spokes. A six-primary color display may include blue, magenta, red, yellow, green and cyan primary color filters, and may implement some of the methods described below for spoke recovery of one or more of blue-magenta, magenta-red, green-yellow, yellow-red, green-cyan, and cyan-blue spokes.

Reference is made to FIG. 1, which is a schematic, simplified isometric-view illustration of a multi-primary display device 100 adapted to reproduce a color image in accordance with exemplary embodiments of the invention.

Display 100 may include a light source 102 adapted to produce polychromatic light, as is known in the art. For example, light source 102 may include a high-pressure mercury lamp, e.g., a UHP™ lamp, available from Philips Lighting, a division of Royal Philips Electronics of Eindhoven, Netherlands, or a Xenon (Xe) type light source, as is known in the art. The device may also include a color switching mechanism, e.g., a color wheel 104, having a plurality of color filters 103 corresponding to a plurality of primary colors, as described below. Device 100 may also include a Spatial Light Modulator (SLM) 106, as is known in the art.

The white light produced by light source 102 may be directed through an appropriate color filter of color wheel 104 in order to produce a corresponding color light beam of a defined spectral range, as described below. For example, device 100 may include a condensing lens 105 to focus the white light on the appropriate color filter. The color light beam may be directed, towards SLM 106, for example, using an extending lens 107, as is known in the art. SLM 106 may modulate the color beam, in accordance with a primary color image component 119, to produce a modulated color light beam corresponding to a primary color image component, as described below. Signal 119 may be generated, e.g., by a controller 121, using any of the methods described in the above-referenced International Patent Application, e.g., by converting a three-primary-color image signal into a multi-primary-color image signal.

Color wheel 104 may be controllably rotated in the path of light emanating from light source 102, e.g., using a motor 109, such that, for example, in each rotation SLM 106 may be sequentially illuminated, e.g., by all the colors on wheel 104. Thus, a plurality of modulated color light beams, e.g., each corresponding to one color image component, may be produced by SLM 106, e.g., in each rotation of color wheel 104. Each of the modulated color light beams may be projected by a projection lens 108 onto a viewing screen 110. In some exemplary embodiments a polarized beam splitter 111 may be implemented in conjunction with SLM 106, as known in the art. In some exemplary embodiments, the rate of rotation may correspond to the frame frequency, i.e., the frequency at which the full-color image on the viewing screen is refreshed. The human viewer integrates the sequential stream of the primary color image components to obtain a full color image when viewing the image as projected onto the viewing screen.

According to embodiments of the invention, specific arrangements of the color filters and/or specific timing relations between the input signal provided to the SLM and the color light beam produced by the color filters may enhance the luminance of the primary colors, as described below.

Figure 2:
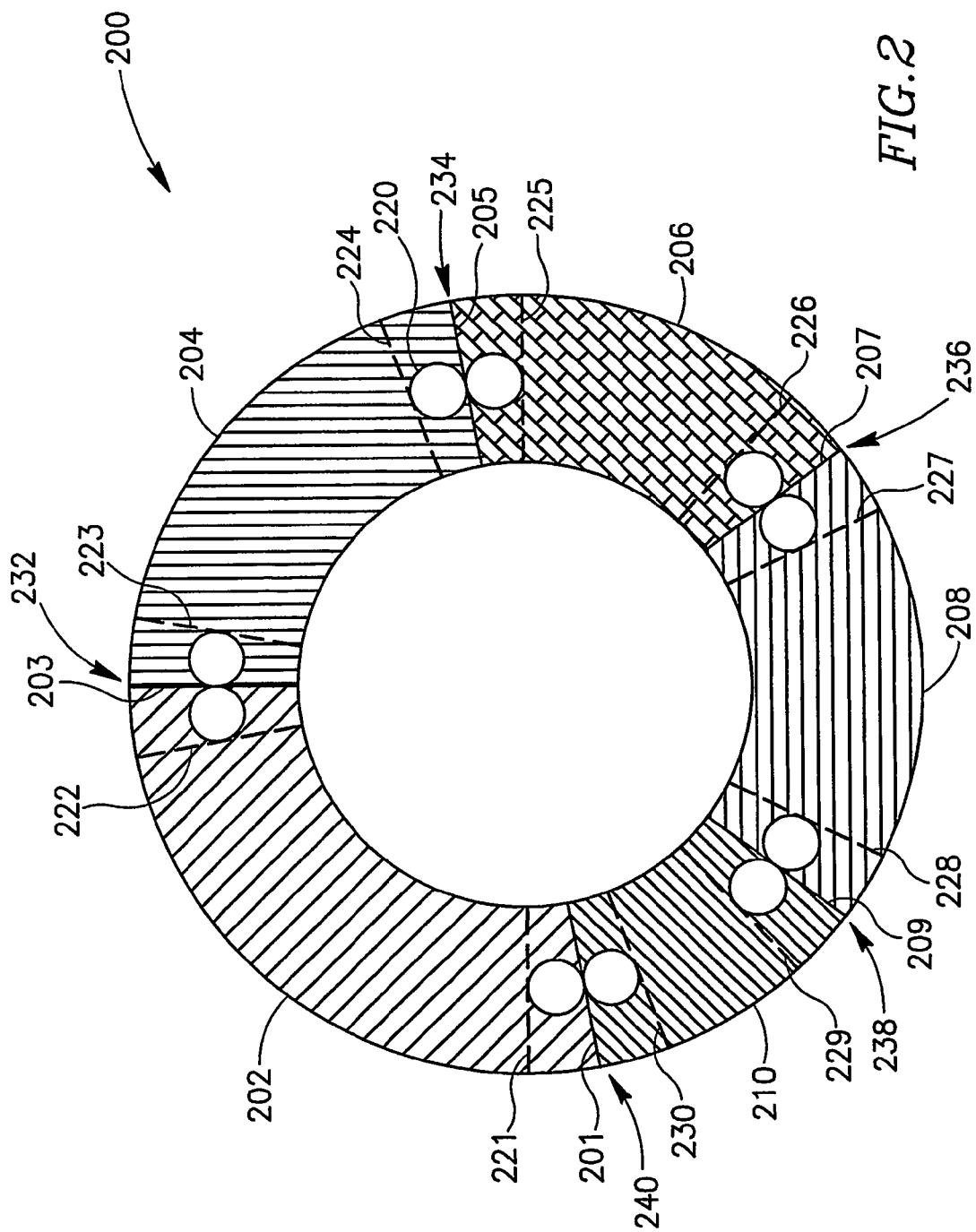
FIG. 2 is a schematic illustration of an arrangement of five color filters on a color wheel, in accordance with exemplary embodiments of the invention.

Reference is also made to FIG. 2, which schematically illustrates an arrangement of five color filters, 202, 204, 206, 208, 210, corresponding to five primary colors, respectively, on a color wheel 200, in accordance with exemplary embodiments of the invention.

According to exemplary embodiments of the invention, color wheel 200 may be part of a multi-primary color display device, for example, device 100 described above.

According to embodiments of the invention, at least three of the color filters may be arranged on the color switching mechanism based on a hue order of the primary colors. In this context, the hue order may be based on the circumferential sequence of the primary colors on a chromaticity diagram as is known in the art. According to the exemplary embodiments of FIG. 2, a yellow filter segment 202 may extend between boundaries 201 and 203 and may include a filter corresponding to a yellow spectral range. A red filter segment 204 may extend between a boundary line 203 and a boundary line 205 and may include a filter corresponding to a red spectral range. A blue filter segment 206 may extend between a boundary line 205 and a boundary line 207 and may include a filter corresponding to a blue spectral range. A cyan filter segment 208 may extend between a boundary line 207 and a boundary line 209 and may include a filter corresponding to a cyan spectral range. A green filter segment 210 may extend between a boundary line 209 and a boundary line 201 and may include a filter corresponding to a green spectral range.

A light beam 220 may be focused on color wheel 200, e.g., as described above. Light beam 220 may illuminate filter segments 202, 204, 206, 208 and 210 when color wheel 200 is rotated, as described above. As light beam 220 passes from one color filter to an adjacent color filter, it may illuminate parts of both color filters, e.g., parts of blue filter 206 and red filter 204 may be illuminated when beam 220 passes over boundary 205. Thus, five-primary color wheel 200 may include five transition regions ("spokes"), in which light beam 220 illuminates two adjacent color filters.

The size of each of the spokes may be related to a "spot size", i.e., a diameter, of beam 220. For example, a blue-red spoke 234 between blue filter 206 and red filter 204 may include the area between a boundary line 224 and a boundary line 225; a red-yellow spoke 232 may include the area between a boundary line 223 and a boundary line 222; a yellow-green spoke 240 may include the area between a boundary line 221 and a boundary line 230; a green-cyan spoke 238 may include the area between a boundary line 229 and a boundary line 228; and a cyan-blue spoke 236 may include the area between a boundary line 227 and a boundary line 226.

According to embodiments of the invention, some or all of the spokes may be used to enhance the luminance of the primary colors, as described below.

Controller 121 may be adapted to perform spoke recovery, i.e., to use the light produced during some or all of the spoke periods, by providing the SLM 106 with a input primary color image component related to the location of light beam 220 on color wheel 200, as described below. Controller 121 may use a synchronization system to coordinate between the input signal and the location of the light beam.

According to exemplary embodiments of the invention, controller 121 may provide SLM 106 with five primary color image components, e.g., during each rotation of wheel 200. When light beam 220 illuminates a spoke, controller 121 may provide SLM 106 with a primary color image component corresponding to one of the two primary color filters adjacent to the illuminated spoke. The primary color image component to be provided to the SLM in each spoke may be selected according to a viewed combination of the colored light beams produced by two subsequent spokes. For example, a viewed combination of a red-yellow light beam and a yellow-green light beam produced when beam 220 illuminates spokes 232 and 240, respectively, may be generally equivalent to a yellow color. A viewed combination of a green-cyan light beam and a cyan-blue light beam produced when beam 220 illuminates spokes 238 and 236, respectively, may be generally equivalent to a cyan color produced by filter 208. Thus, for example, controller 121 may provide SLM 106 with yellow image component data when beam 220 illuminates spokes 232 and/or 240, and with cyan image component data when beam 220 illuminates spokes 238 and/or 236. It will be appreciated that a blue-red color beam produced when beam 220 illuminates spoke 234 does not substantially affect the viewed blue image component. Thus, for example, controller 121 may provide SLM 106 with blue image component data when beam 220 illuminates spoke 234.

According to the exemplary embodiments of FIG. 2, controller 121 may provide SLM 106 with an input signal corresponding to a yellow image component during a yellow electronic interval, i.e., when beam 220 is in the region confined between boundaries 223 and 230; an input signal corresponding to a green image component during a green electronic interval, i.e., when beam 220 is in the region confined between boundaries 230 and 229; an input signal corresponding to a cyan image component during a cyan electronic interval, i.e., when beam 220 is in the region confined between boundaries 229 and 226; an input signal corresponding to a blue image component during a blue electronic interval, i.e., when beam 220 is in the region confined between boundaries 226 and 224; and an input signal corresponding to a red image component during a red electronic interval, i.e., when beam 220 is in the region confined between boundaries 224 and 222. Thus, the input signal provided to SLM 106 may include image components according to the five electronic color intervals defined according to the regions described above.

According to some embodiments of the invention, SLM 106 may be of a binary modulation type. Examples of the binary modulation type include, but are not limited to, Digital Micro-mirror Device (DMD) and Ferroelectric Liquid Crystal FLC, as are known in the art. The binary type SLM may use Pulse Width Modulation (PWM) for creating gray levels by controlling a luminance of a displayed primary color. This is achieved by controlling a display-period of the primary color, i.e., the SLM may display the primary color image component for a display period during a fraction of the electronic color interval. For example, in order to display a yellow color having half of a maximal luminance value, SLM 106 may use the color light beam produced by color wheel 104 to display the yellow image component during half of the electronic yellow interval.

According to embodiments of the invention, the electronic color interval of some of the primary colors, e.g., yellow and cyan, may include adjacent spoke periods, as described above. Thus, if a color is displayed for a period shorter than the electronic color interval, color mixing may occur, if the display-period includes unequal contributions of the two spoke periods adjacent to the displayed color. For example, a yellow color having a display-period beginning in spoke 240 and ending before spoke 232 may be affected by the green contribution of spoke 240 and not affected by the red contribution of spoke 232.

In order to minimize color mixing, at least some display-periods may be distributed across the corresponding electronic color interval such that a substantially symmetrical contribution of the adjacent spoke periods is achieved, as described below. For example, a yellow display-period may include symmetric contribution of the red-yellow and the yellow-green spoke periods, and a cyan display-period may include symmetric contributions of the green-cyan and the cyan-blue spoke periods. The symmetric contribution of the adjacent spoke periods may be accomplished by independently controlling each digital value corresponding to a displayed image pixel, i.e., the digital value may be transformed into a time fraction, which may be within a corresponding electronic color interval. This may be achieved, for example, by controlling, e.g., using controller 121, the beginning and the end of the SLM "on" mode of operation. For example, the digital value of each pixel may be transformed, e.g., by controller 121, into two timing signals, wherein one timing signal defines when to switch off a corresponding pixel of the SLM after the beginning of the electronic color interval, and the second timing signal defines when to switch the same SLM pixel on again before the end of the electronic color interval.

In fully digital display systems, a timing sequence for displaying each pixel may be digitized, i.e., the pixels may be turned on and off at pre-defined times. In such systems, the input signal provided to the SLM, e.g., by the controller, may be divided into bit planes, and each bit plane may be provided to the SLM for a time period corresponding to the significance of the bit plane. For example, the most significant bit may be provided to the SLM, e.g., by the controller, for half of the electronic color interval, the second-most significant bit may be provided to the SLM for a quarter of the electronic color interval, and so on, such that the i-th most significant bit plane may be provided to the SLM for $2^{-i}$ of the electronic color interval. In many applications, the higher significance bit planes may be further divided into sub-bit planes in order to smooth transitions between bit planes. Each bit plane is related to a predefined time slot, corresponding to a different fraction of the electronic color interval, e.g., the time slot of the most significant bit plane may correspond to the first half of the electronic color interval. Thus, each required display-period may be a combination of one or more of the bit planes. For example, a display-period of 129/255 may correspond to a combination of the most significant bit plane (128/255) and a least significant bit plane (1/255).

In such systems, the spoke period may be much larger than the time slot of the least significant bit plane. Thus, if the least significant bit plane corresponding to a primary color, e.g., yellow, is related to an adjacent spoke period, e.g., red-yellow, the color, e.g., red, of the least significant bit plane may be different from the color, e.g., yellow, of the other bit planes, resulting in potential color errors.

According to exemplary embodiments of the invention, the bit planes of the highest significance may be related to the spoke periods. According to one exemplary embodiment, the most significant plane may be split between the two sides of the electronic color interval. Thus, the two adjacent spokes may be included in the most significant bit plane, e.g., for a display period equal to or shorter than 127/255 neither of the spoke periods may be used, and for a display period equal to or longer than 128/255 both spoke periods may be used. Therefore, opposing color shifts produced by the spokes, e.g., red-yellow and green-yellow shifts, may substantially cancel each other out when viewed, as described above. Furthermore, since the most significant bit plane covers the largest fraction of the electronic color interval, the influence of the spokes on the viewed color is further minimized.

Some display devices may not support the splitting of the most significant bit plane described above. Therefore, according to further exemplary embodiments of the invention, the most significant plane may be related to one end of the electronic color interval and the second-most significant bit plane may be related to the other end. It is appreciated that this arrangement may cause a shift in chromaticity and/or luminance. Such a shift, which may be a function of gray level, is mostly minor and may generally be ignored. However, if a high accuracy of color reproduction is required, these minor changes may be corrected by performing an inter-color gamma adjustment, as described below.

Figure 3:
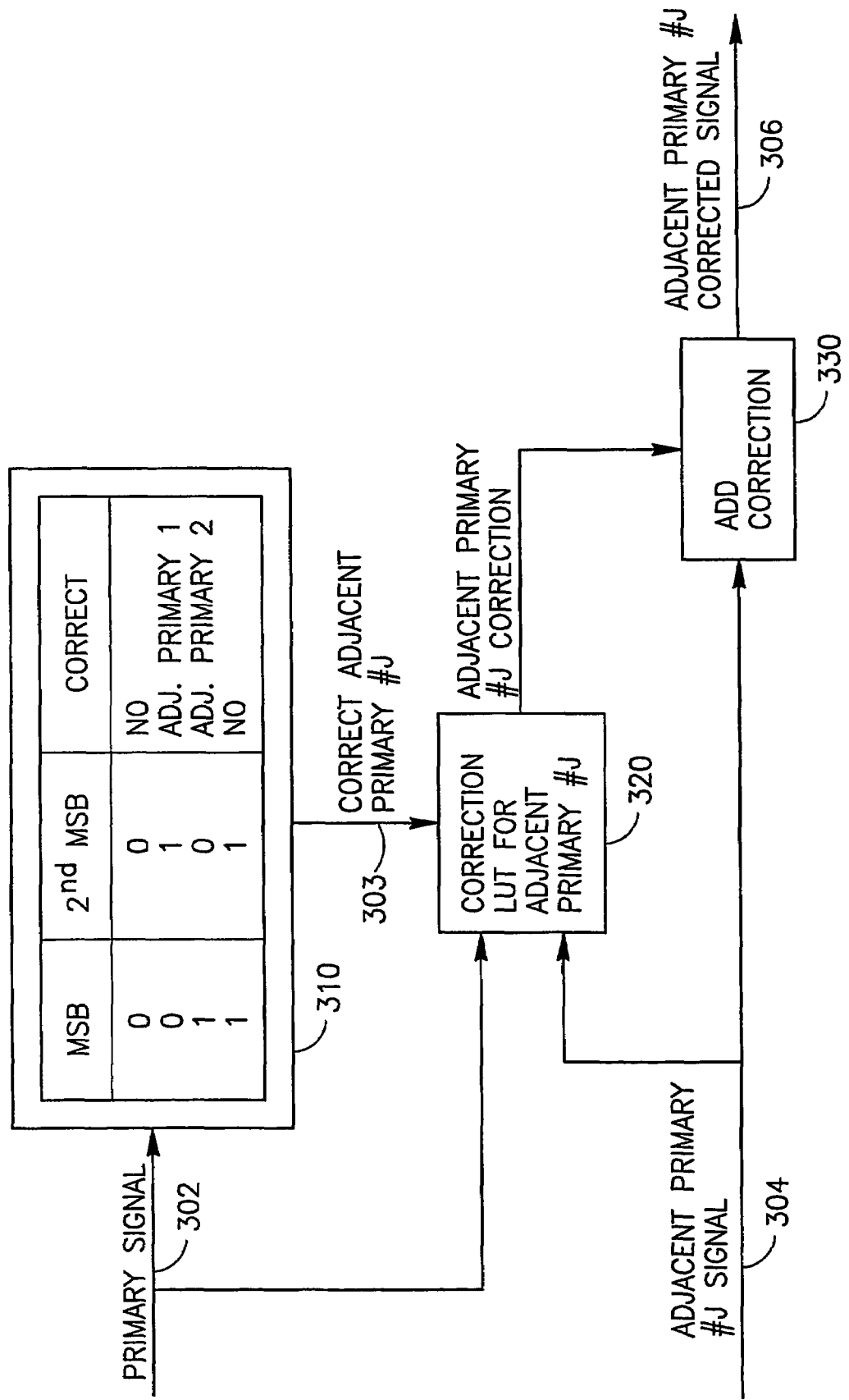
FIG. 3 is a schematic illustration of a block diagram of an exemplary implementation of a method of inter-color gamma adjustment according to an exemplary embodiment of the invention.

Reference is made to FIG. 3, which illustrates a block diagram of an exemplary implementation of a method of inter-color gamma adjustment according to an exemplary embodiment of the invention.

As indicated at block 310, the inter-color gamma adjustment may include determining a value of the most significant bit and the second-most significant bit of a primary color signal 302 and, according to these values, producing a signal 303 identifying which of the adjacent primary colors is to be corrected.

According to signal 303, a correction signal for an adjacent primary color 304 may be produced, as indicated at block 320. The correction signal may be determined by a calculation or a look-up-table.

The correction signal may be added to an adjacent primary color 304 to produce a corrected signal 306, as indicated at block 330.

For example, the most significant bit plane related to the electronic yellow interval may be related to the yellow-green spoke, and the second most significant bit may be related to the red-yellow spoke. Thus, for any pixel having a yellow input signal in the range of 128-255, wherein the most significant bit equals 1 and the least significant bit equals zero (in an 8 bit/primary system), the red data (primary 2) of the pixel may be adjusted to compensate for a slight green shift. Accordingly, for any pixel with a yellow input signal in the range of 64-127, wherein the second most significant bit equals 1 and the most significant bit equals zero, the green data (primary 1) of the pixel may be adjusted to compensate for a slight red shift.

According to yet further exemplary embodiments of the invention, the electronic color interval may be divided into a plurality of bit planes such that a small fraction, at the most, of the display period may include a fraction of the spoke periods, as described below. Each bit plane may be related to a predefined time slot, corresponding to a different fraction of the electronic color interval such that at least some, e.g., all, bit planes corresponding to fractions of the spokes ("spoke bit planes") are related to a substantially small time slot, some bit planes corresponding to fractions of the electronic color interval not including the spokes ("non-spoke bit planes") are related to a substantially large time slot, and some non-spoke bit planes are related to a substantially small time slot. A threshold value may be pre-selected such that display periods equal to or smaller than the threshold value may be related with at least some non-spoke bit planes, and display periods bigger than the threshold value may be related with at least some, e.g., all, the non-spoke bit planes and with at least some of the spoke bit planes. The threshold value may be selected as substantially the fraction of the electronic color interval not including the spokes out of the total electronic color interval. Thus, color variations due to the spoke periods may be minimized, since each display period is at least mostly related to non-spoke bit planes.

Figure 4A:
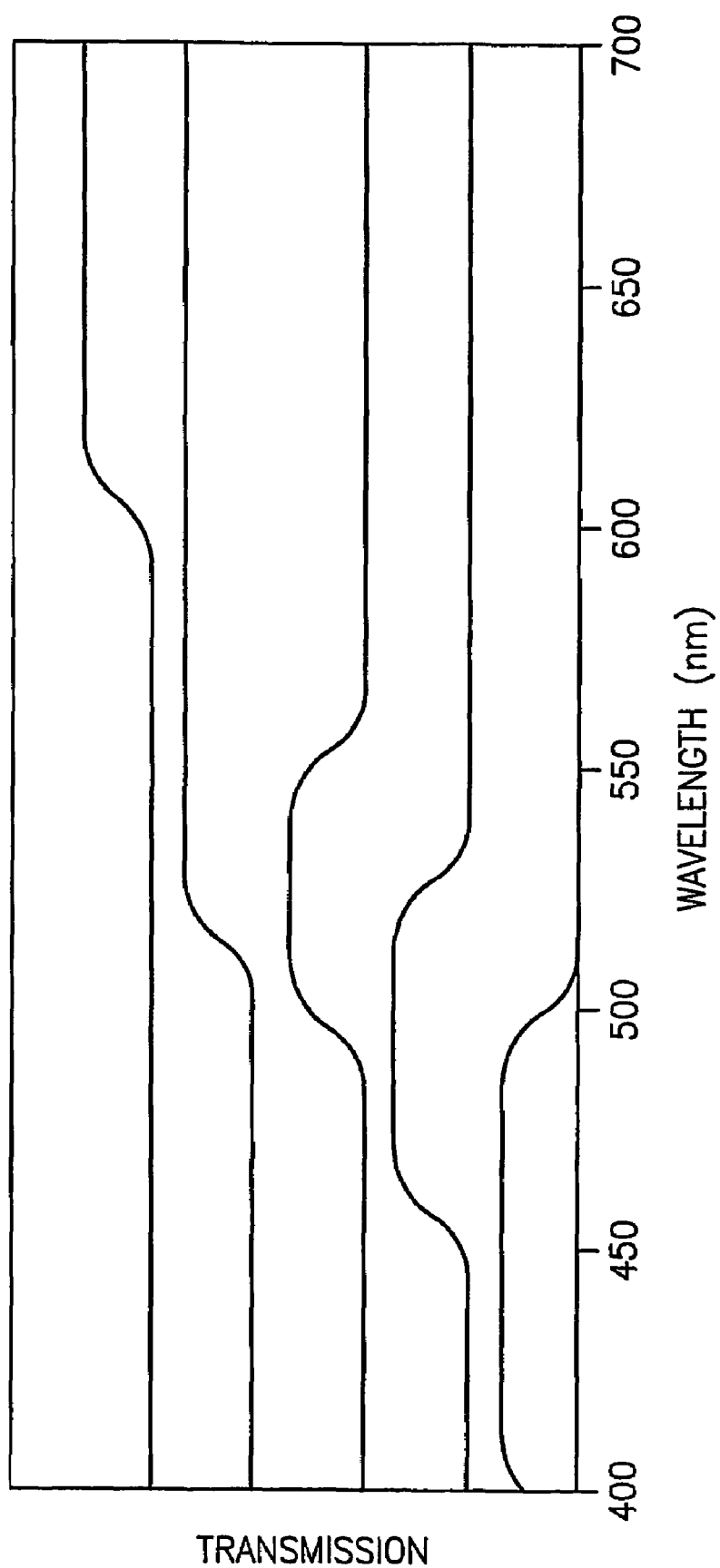
FIG. 4A is a schematic illustration of graphs of five exemplary primary color wavelength spectra for a color display using the color wheel of FIG. 2.
Figure 4B:
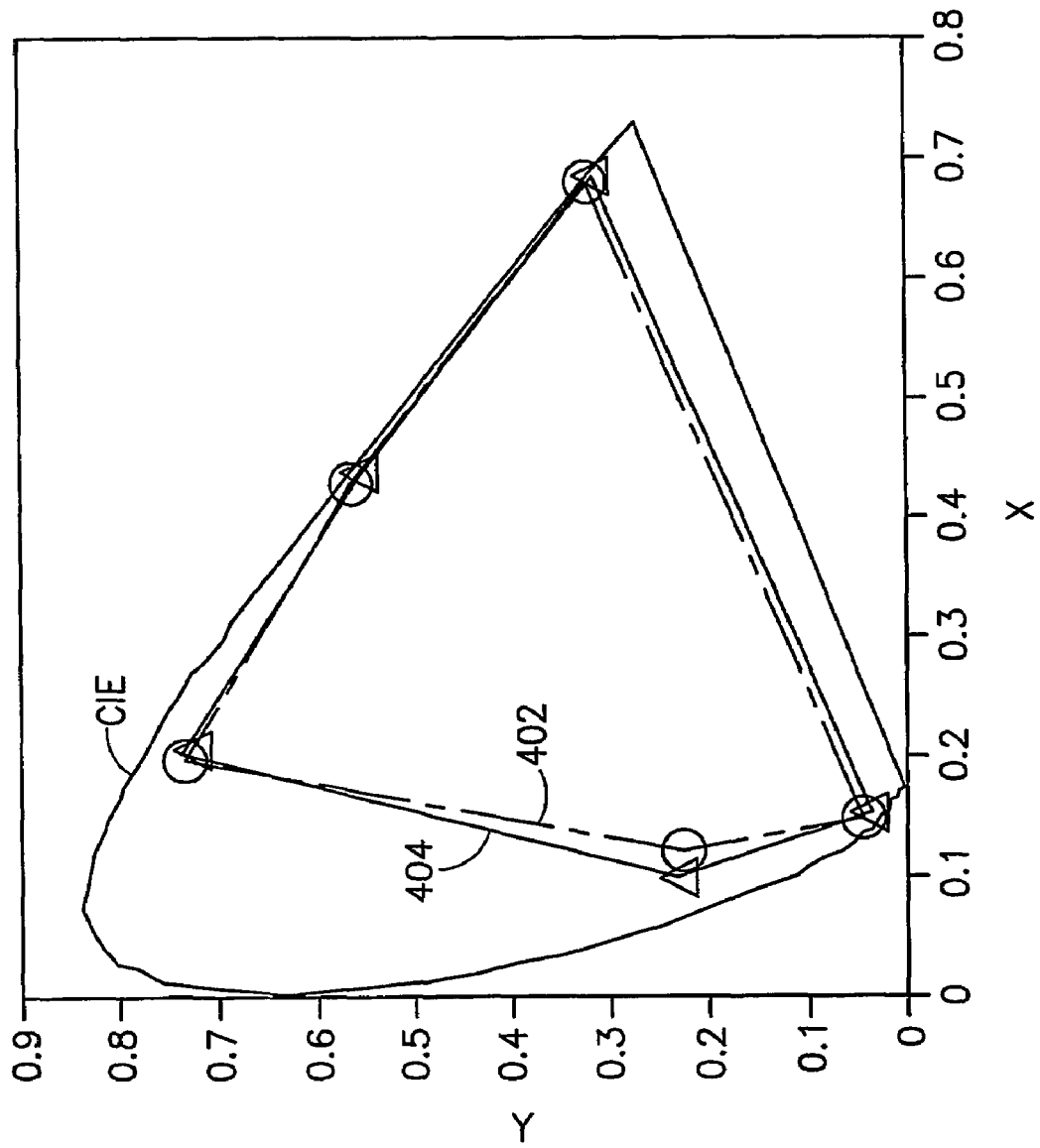
FIG. 4B is a schematic illustration of chromaticity diagrams representing a color gamut resulting from the five primary color spectra of FIG. 4A when spoke recovery is implemented, compared to a color gamut resulting from the five primary color spectra of FIG. 4A when spoke recovery is not implemented.

Reference is also made to FIG. 4A, which schematically illustrates graphs of five exemplary primary color wavelength spectra for a color display using the color wheel of FIG. 2, and to FIG. 4B, which schematically illustrates chromaticity diagrams representing a color gamut 402 resulting from the five primary color spectra of FIG. 4A when spoke recovery is implemented, compared to a color gamut 404 resulting from the five primary color spectra of FIG. 4A when spoke recovery is not implemented.

As clearly shown in FIG. 4B, color gamut 404 is substantially covered by color gamut 402. The luminance values for the colors obtained for a display implementing spoke recovery is about 25% higher than the luminance value obtained for the same colors from a five-primary display not implementing spoke recovery, e.g., by turning the SLM to an "off" mode of operation during the transition time between two adjacent color filters.

It may be appreciated by those skilled in the art, that the multi-primary display device according to embodiments of the invention may implement spoke recovery to enhance luminance values of primary colors. It may further be appreciated that the display device according to embodiments of the invention may implement spoke recovery without requiring calculation of any additional image components, for example, white image components and/or secondary color image components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A display device for producing a color image including at least four non-white colors comprising:
    a color wheel including at least four non-white color filters, each having a respective non-white color;
    a controller to control a spatial light modulator to produce at least four color image components, each color image component corresponding to a color of said non-white color filters during a respective display period, at least a first of said display periods including a first spoke period corresponding to illumination of a first non-white color filter and at least a sequentially adjacent portion of a second spoke period corresponding to illumination of a second color filter.

2. The device of claim 1, wherein said first display period further comprises at least a portion of a third spoke period corresponding to illumination of a third color filter of said non-white color filters, said portion of the third spoke period sequentially adjacent to said first spoke period.

3. The device of claim 2, wherein said first display period has a desired distribution between the spoke period of said first and second color filters and the spoke period of said first and third color filters.

4. The device of claim 3, wherein said first display period is distributed generally symmetrically between the spoke period of said first and second color filters and the spoke period of said first and third color filters.

5. The device of claim 2, wherein said first display period is represented by a plurality of bit planes including one or more highest significance bit planes, and wherein one or more of said highest significance bit planes correspond to at least one of the spoke period of said first and second color filters and the spoke period of said first and third color filters.

6. The device of claim 5, wherein a most significant bit plane of said one or more highest significance bit planes corresponds to both the spoke period of said first and second color filters and the spoke period of said first and third color filters.

7. The device of claim 5, wherein a most significant bit plane of said one or more highest significance bit planes corresponds to a first end of an electronic color interval including the spoke period of said first and second color filters, and a second-most significant bit plane of said one or more highest significance bit planes corresponds to a second end of said electronic color interval including the spoke period of said first and third color filters.

8. The device of claim 5, wherein said controller is able to control said spatial light modulator to produce a corrected succeeding color image component corresponding to said third color filter based on a value of a most significant bit plane and a second-most significant bit plane of said one or more highest significance bit planes.

9. The device of claim 2, wherein said first display period is represented by a plurality of bit planes including at least one spoke bit plane corresponding to at least one of the spoke period of said first and second color filters and the spoke period of said first and third color filters, wherein said at least one spoke bit plane represents a time period shorter than a predetermined time period threshold.

10. The device of claim 2, wherein said controller is able to control said spatial light modulator such that a viewed combination of colored light of the spoke period of said first and second color filters and colored light of the spoke period of said first and third color filters is generally equivalent to said first color filter.

11. The device of claim 2, wherein said first, second and third color filters are yellow, green and red, respectively.

12. The device of claim 2, wherein said first, second and third color filters are cyan, green and blue, respectively.

13. The device of claim 2, wherein said first, second and third color filters are magenta, blue and red, respectively.

14. The device of claim 1, wherein said color filters are arranged sequentially according to their hue values.

15. The device of claim 1, wherein said first display period comprises at least most of the spoke period of said second color filter.

16. A method for producing a color image using a color wheel including at least four non-white color filters, each having a respective non-white color, said method comprising:
producing at least four color image components, each color image component corresponding to a color of said non-white color filters during a respective display period, at least a first of said display periods including a first spoke period corresponding to illumination of a first non-white color filter and at least a sequentially adjacent portion of a second spoke period corresponding to illumination of a second color filter.

17. The method of claim 16, wherein said first display period further comprises at least a portion of a third spoke period corresponding to illumination of a third color filter of said non-white color filters, said portion of the third spoke period sequentially adjacent to said first spoke period.

18. The method of claim 17, wherein said first display period has a desired distribution between the spoke period of said first and second color filters and the spoke period of said first and third color filters.

19. The method of claim 18, wherein said first display period is distributed generally symmetrically between the spoke period of said first and second color filters and the spoke period of said first and third color filters.

20. The method of claim 17, wherein said first display period is represented by a plurality of bit planes including one or more highest significance bit planes, and wherein one or more of said highest significance bit planes correspond to at least one of the spoke period of said first and second color filters and the spoke period of said first and third color filters.

21. The method of claim 20, wherein a most significant bit plane of said one or more highest significance bit planes corresponds to both the spoke period of said first and second color filters and the spoke period of said first and third color filters.

22. The method of claim 20, wherein a most significant bit plane of said one or more highest significance bit planes corresponds to a first end of said electronic color interval including the spoke period of said first and second color filters, and a second-most significant bit plane of said one or more highest significance bit planes corresponds to a second end of said electronic color interval including the spoke period of said first and third color filters.

23. The method of claim 20 comprising producing a corrected succeeding color image component corresponding to said third color filter based on a value of a most significant bit plane and a second-most significant bit plane of said one or more highest significance bit planes.

24. The method of claim 17, wherein said first display period is represented by a plurality of bit planes including at least one spoke bit plane corresponding to at least one of the spoke period of said first and second color filters and the spoke period of said first and third color filters, wherein said at least one spoke bit plane represents a time period shorter than a predetermined time period threshold.

25. The method of claim 17, wherein producing a color image component comprises producing said color image component such that a viewed combination of colored light of the spoke period of said first and second color filters and colored light of the spoke period of said first and third color filters is generally equivalent to said first color filter.

26. The method of claim 17, wherein said first, second and third color filters are yellow, green and red, respectively.

27. The method of claim 17, wherein said first, second and third color filters are cyan, green and blue, respectively.

28. The method of claim 17, wherein said first, second and third color filters are magenta, blue and red, respectively.

29. The method of claim 16, comprising sequentially producing colored light of a plurality of colors.

30. The method of claim 29, wherein sequentially producing colored light comprises sequentially passing light through said plurality of non-white color filters corresponding to said plurality of non-white colors, respectively.

31. The method of claim 30, wherein the illumination sequence of said filters is according to their hue values.

32. The method of claim 16, wherein said first display period comprises at least most of the spoke period of said second color filter.

33. A display device for producing a color image including at least four non-white colors comprising:
a light source to sequentially illuminate at least first, second, third and fourth non-white color filters of a color switching mechanism;
a spatial light modulator to modulate colored light of said color wheel in accordance with four or more non-white color image component signals, said color image component signals corresponding to said non-white color filters, respectively; and
a controller to sequentially generate said four or more non-white color image component signals during four or more electronic color intervals, respectively, wherein at least a first of said electronic color intervals includes a first spoke period corresponding to illumination by said light source of the corresponding first non-white color filter and at least a portion of a second spoke period corresponding to illumination by said light source of the corresponding second non-white color filter.

34. The device of claim 33, wherein said first electronic color interval further includes at least part of a third spoke period corresponding to illumination by said light source of the corresponding third non-white color filter.

* * * * *